Figure 10:
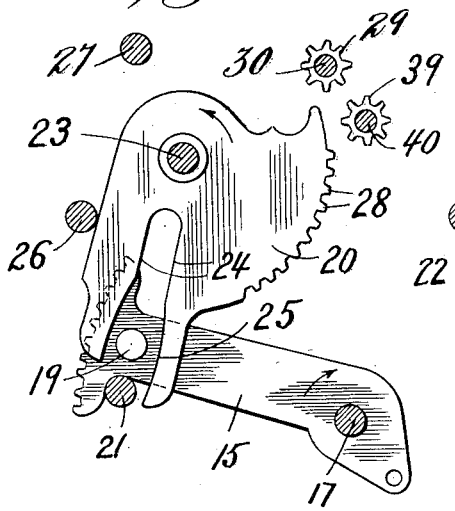

No. 741,961. PATENTED OCT. 20, 1903.
H. E. GOLDBERG.
CALCULATING MACHINE.
APPLICATION FILED JUNE 11, 1902.
NO MODEL. 14 SHEETS—SHEET 1.
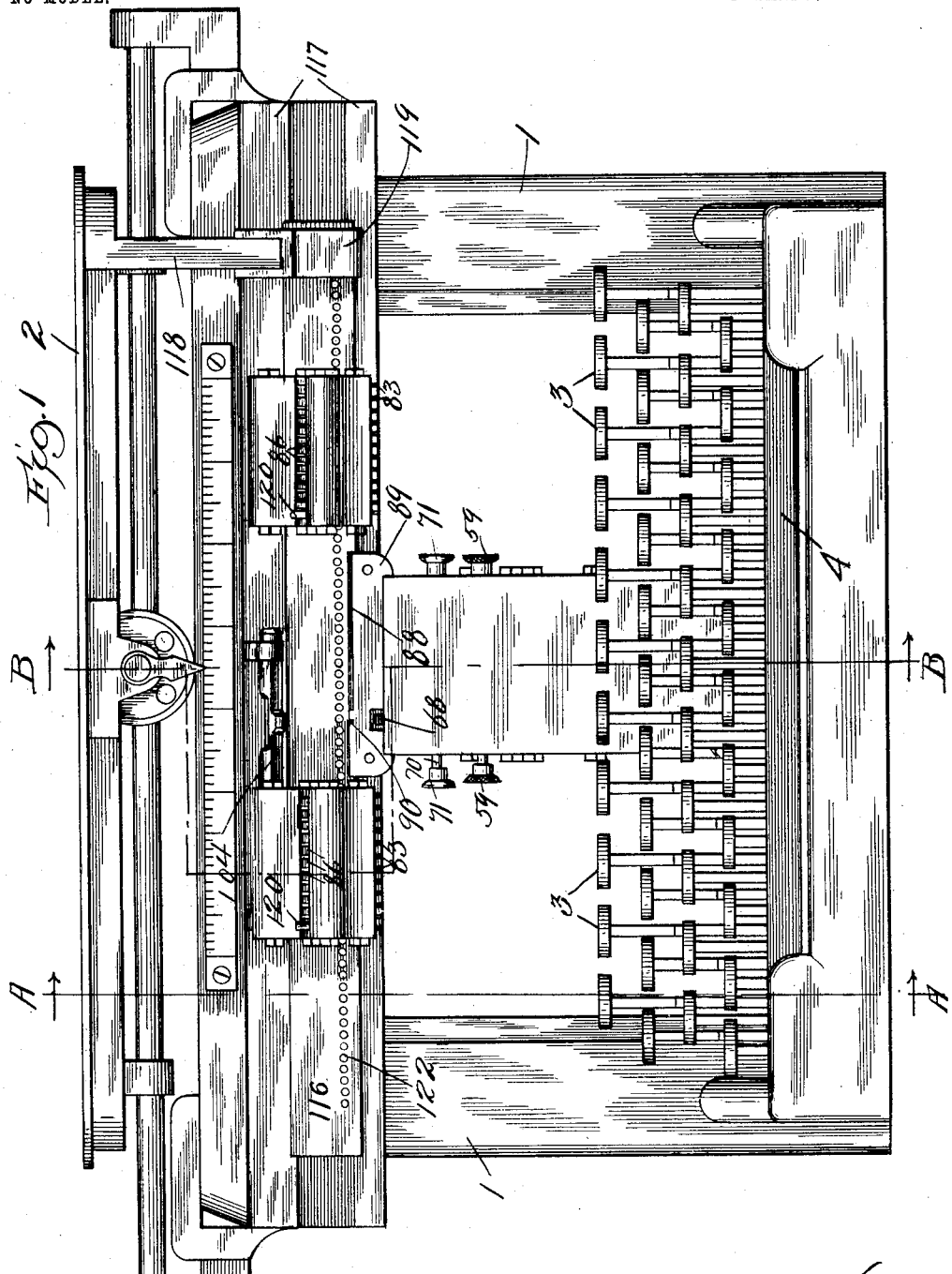
Witnesses:
Inventor:
Hyman E. Goldberg.
By Jesse & H. M. Cox
Attys.

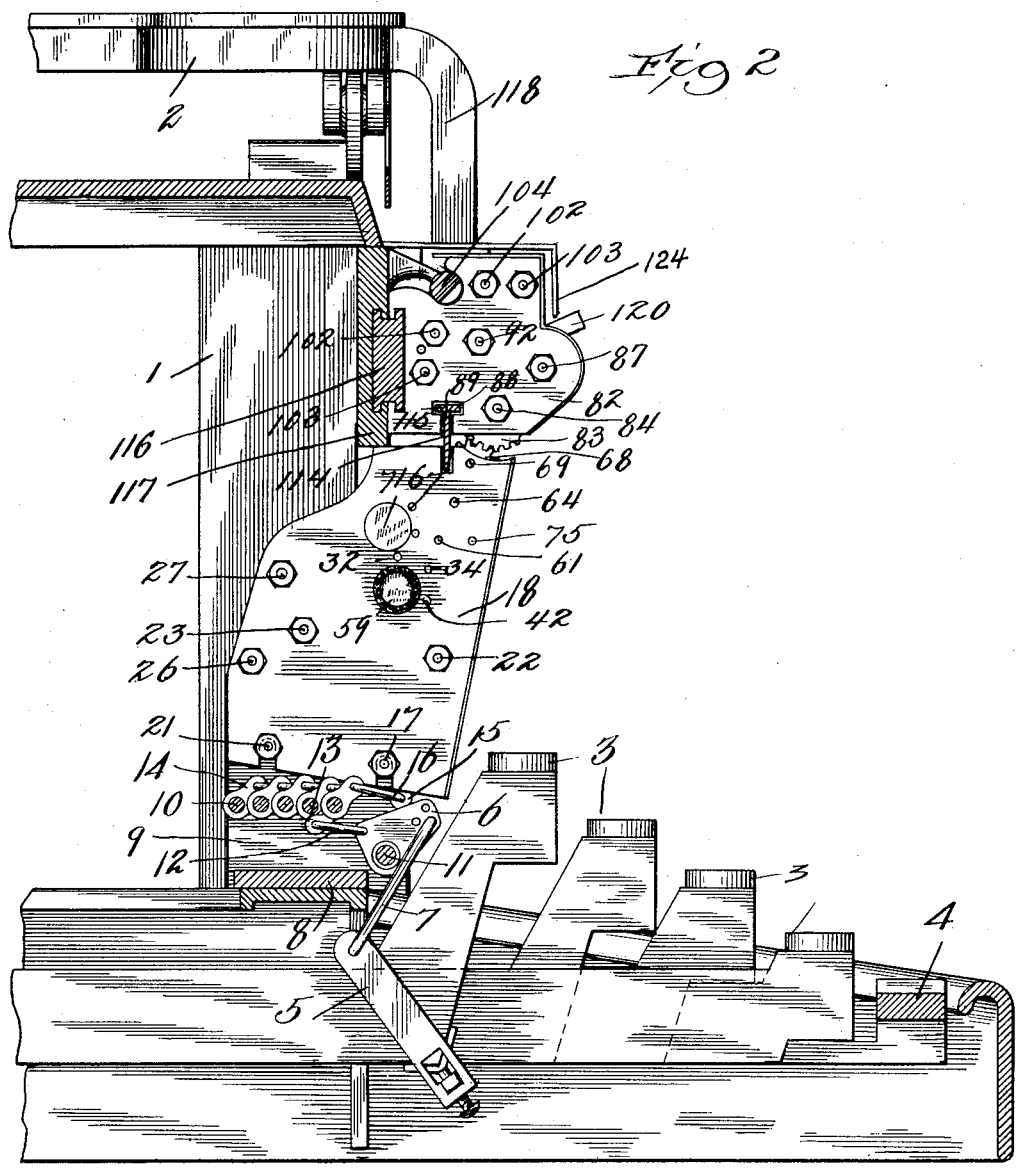

No. 741,961. PATENTED OCT. 20, 1903.
H. E. GOLDBERG.
CALCULATING MACHINE.
APPLICATION FILED JUNE 11, 1902.
NO MODEL. 14 SHEETS—SHEET 3.
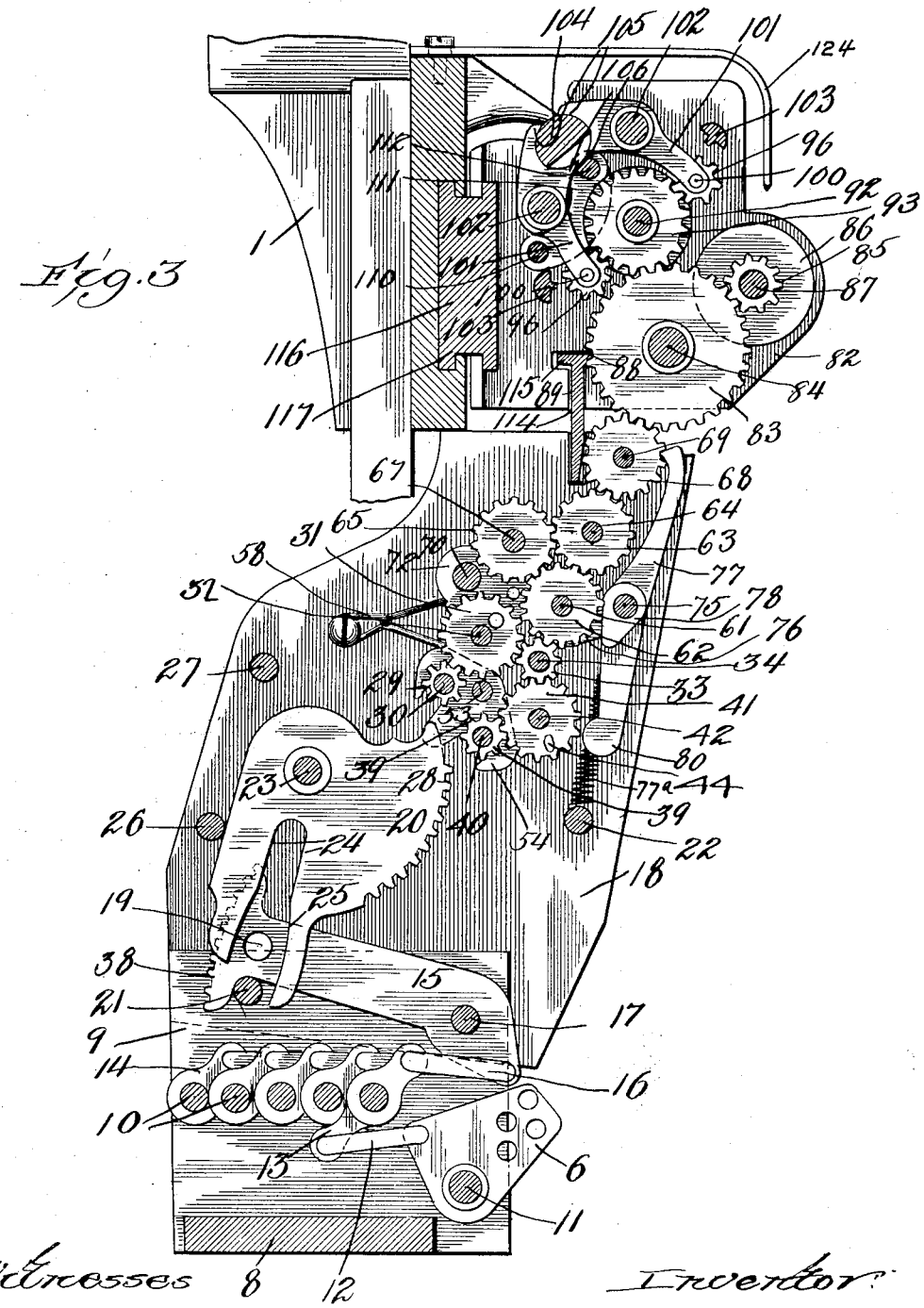

No. 741,961. PATENTED OCT. 20, 1903.
H. E. GOLDBERG.
CALCULATING MACHINE.
APPLICATION FILED JUNE 11, 1902.
NO MODEL.
14 SHEETS—SHEET 4.
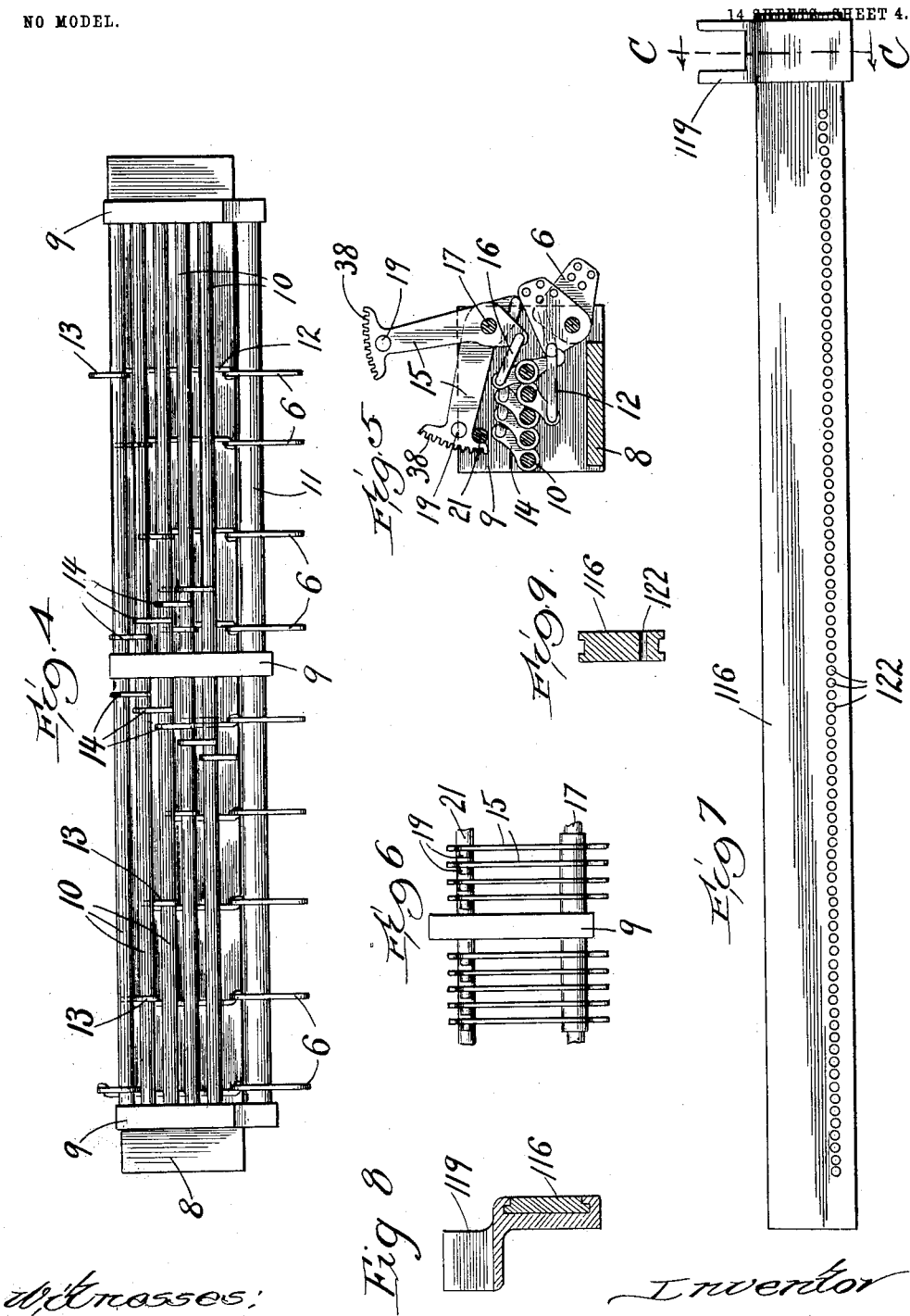

No. 741,961. PATENTED OCT. 20, 1903.
H. E. GOLDBERG.
CALCULATING MACHINE.
APPLICATION FILED JUNE 11, 1902.
NO MODEL. 14 SHEETS—SHEET 5.

Witnesses:
Harry R. Little
Arthur M. Cox

Inventor:
Hyman E. Goldberg
By Jesse & H. M. Cox, Attys.

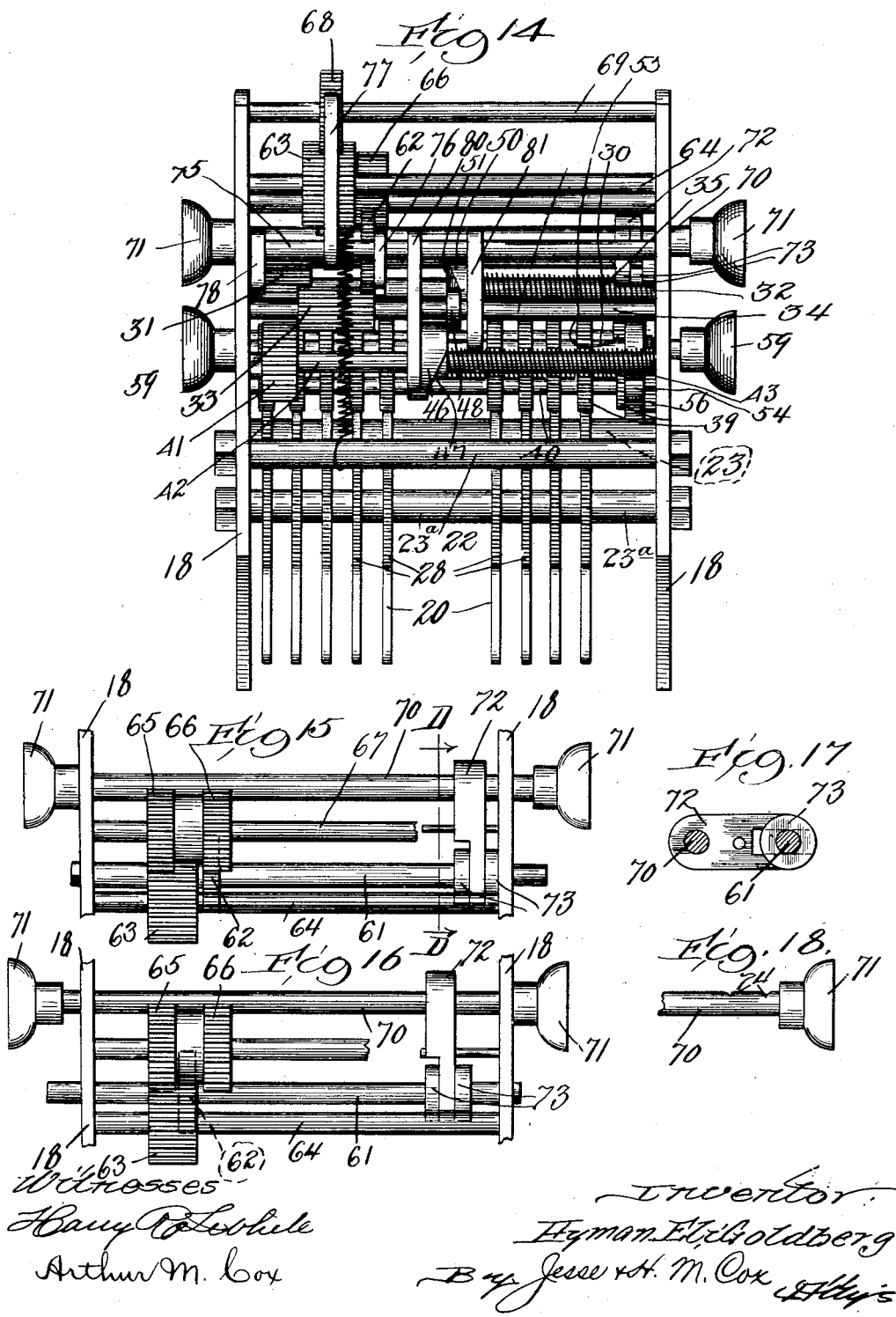

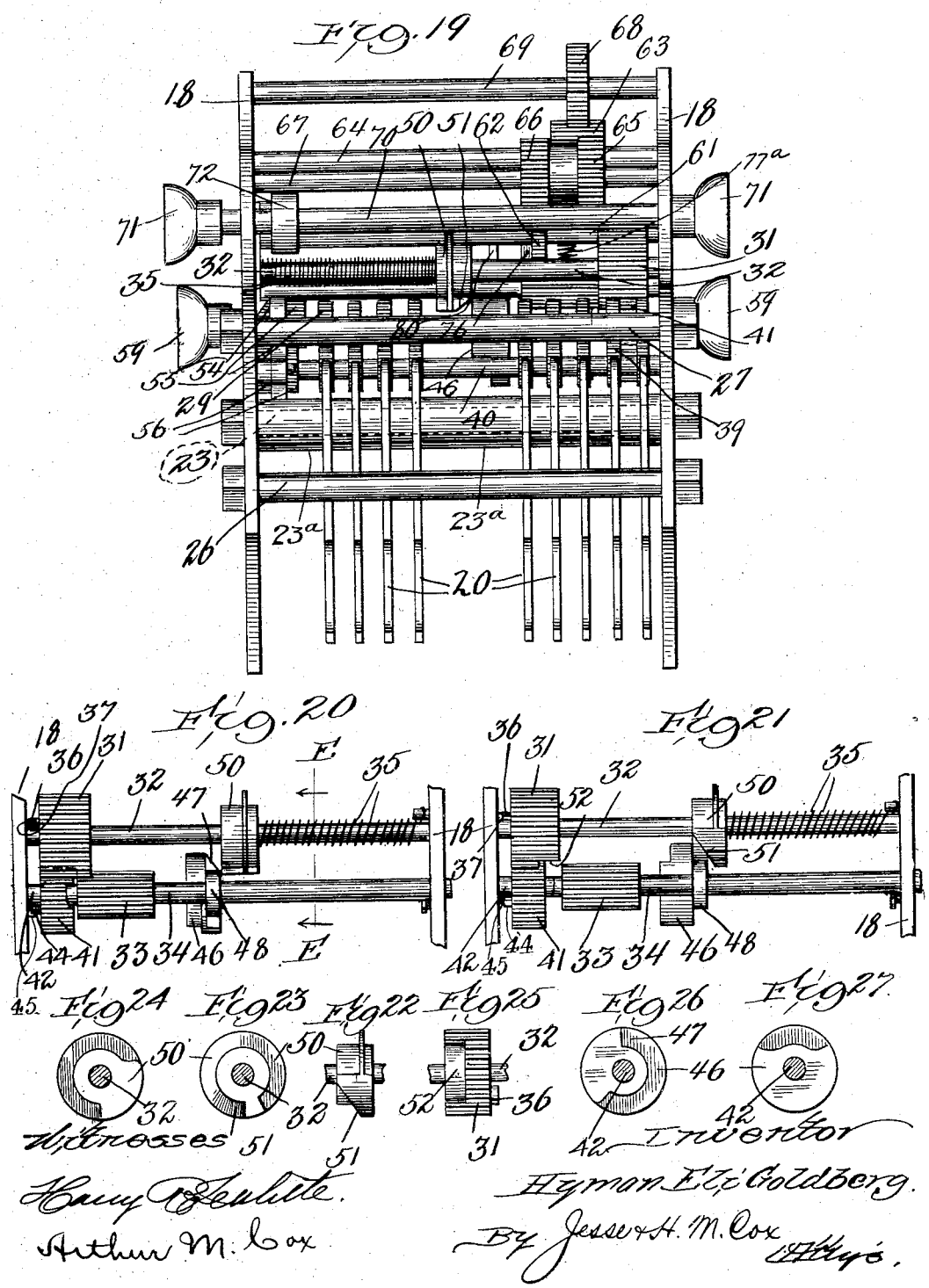

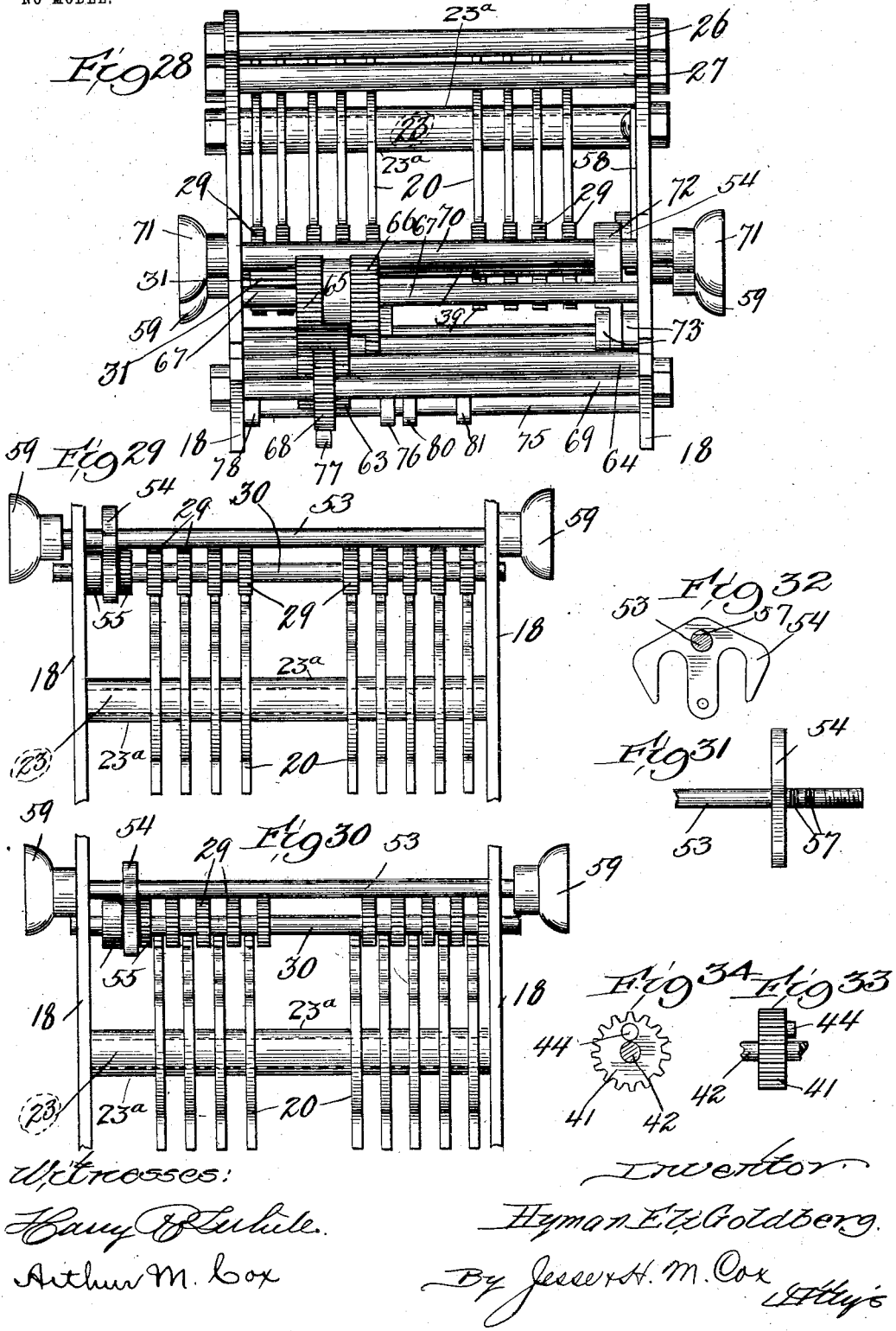

No. 741,961. PATENTED OCT. 20, 1903.
H. E. GOLDBERG.
CALCULATING MACHINE.
APPLICATION FILED JUNE 11, 1902.
NO MODEL. 14 SHEETS—SHEET 9.
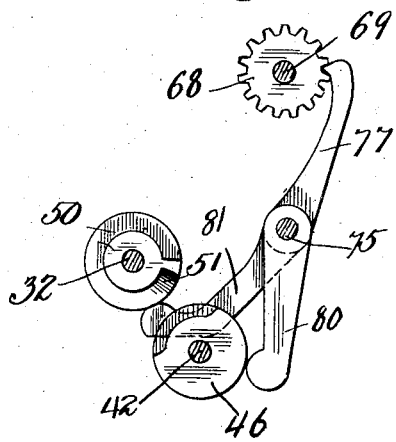
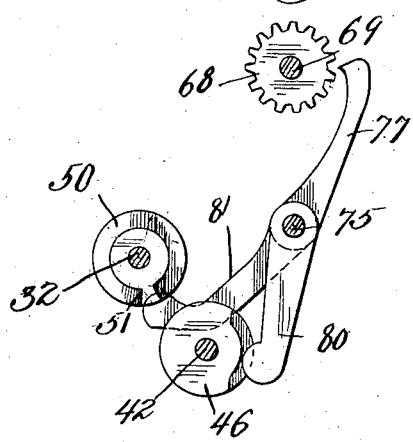
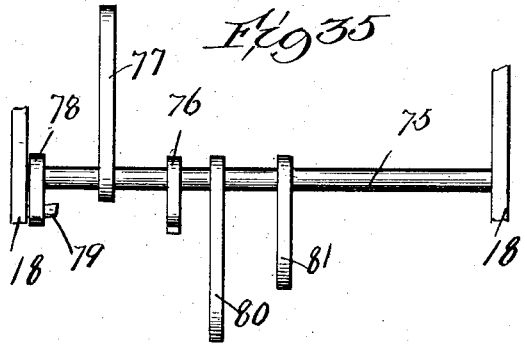
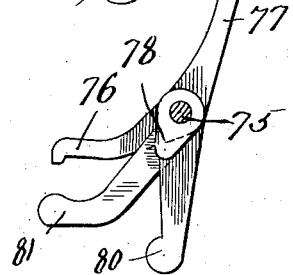
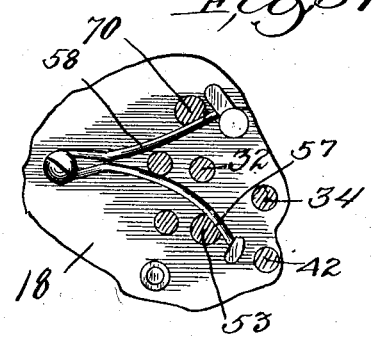
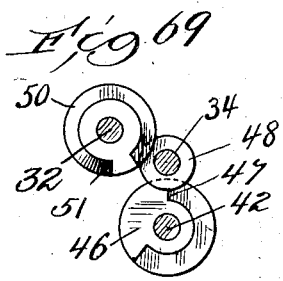
Witnesses:
Harry Oberlin
Arthur M. Cox
Inventor
Hyman E. Goldberg
By Jesse & H. M. Cox Atty's No. 741,961. PATENTED OCT. 20, 1903.
H. E. GOLDBERG.
CALCULATING MACHINE.
APPLICATION FILED JUNE 11, 1902.
NO MODEL. 14 SHEETS—SHEET 10.
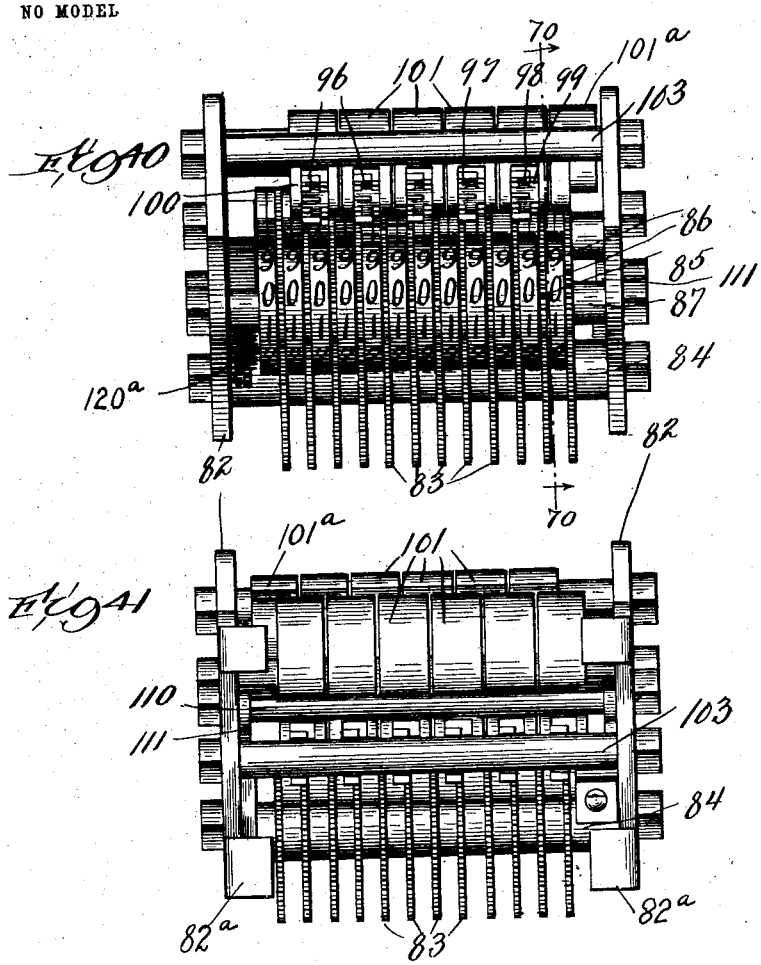
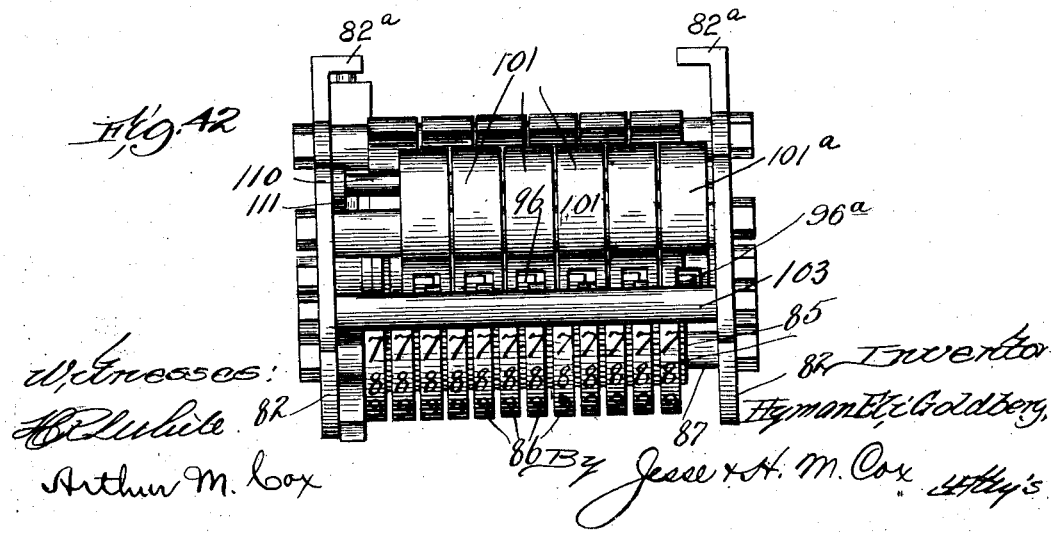

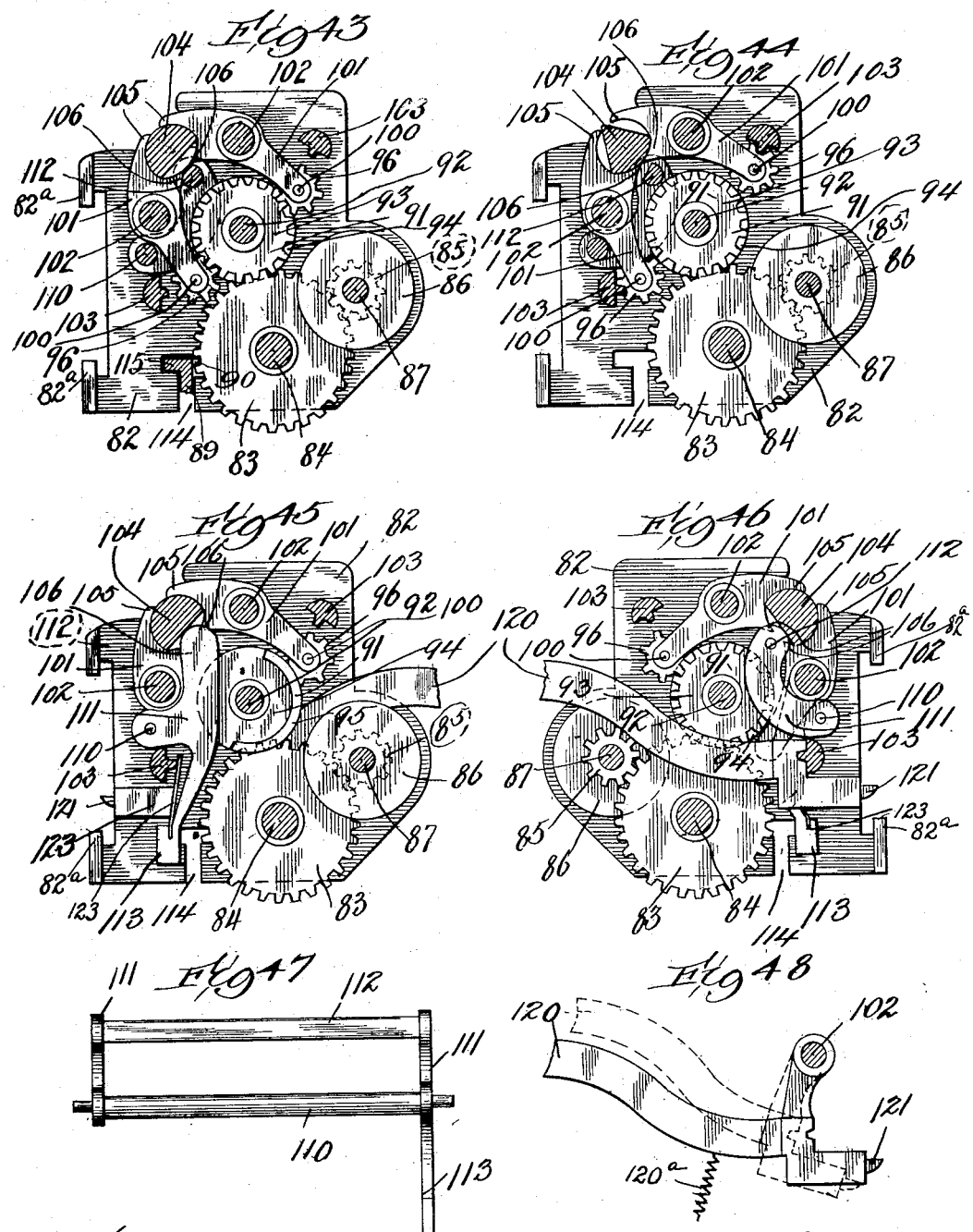

No. 741,961. PATENTED OCT. 20, 1903.
H. E. GOLDBERG.
CALCULATING MACHINE.
APPLICATION FILED JUNE 11, 1902.
NO MODEL. 14 SHEETS—SHEET 12.
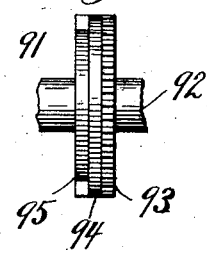
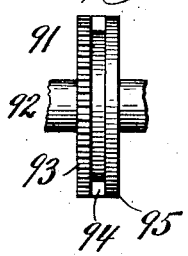
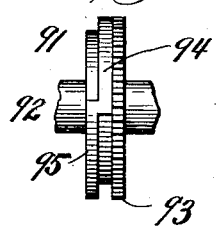
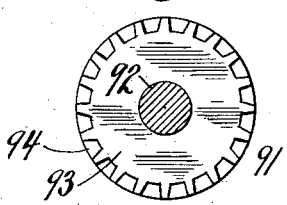
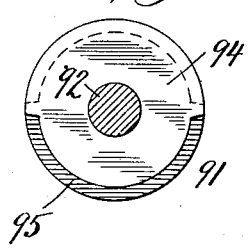
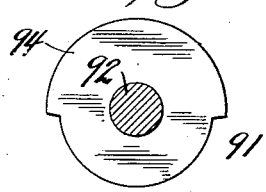
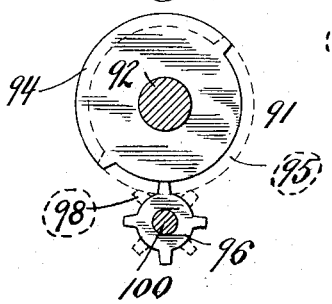
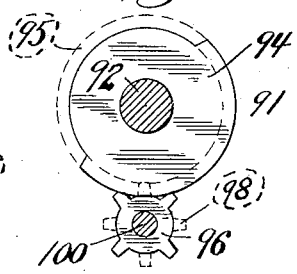
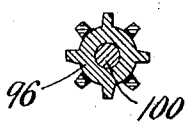
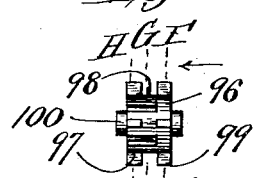
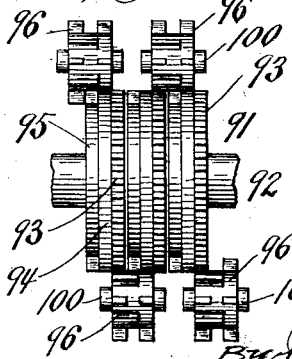

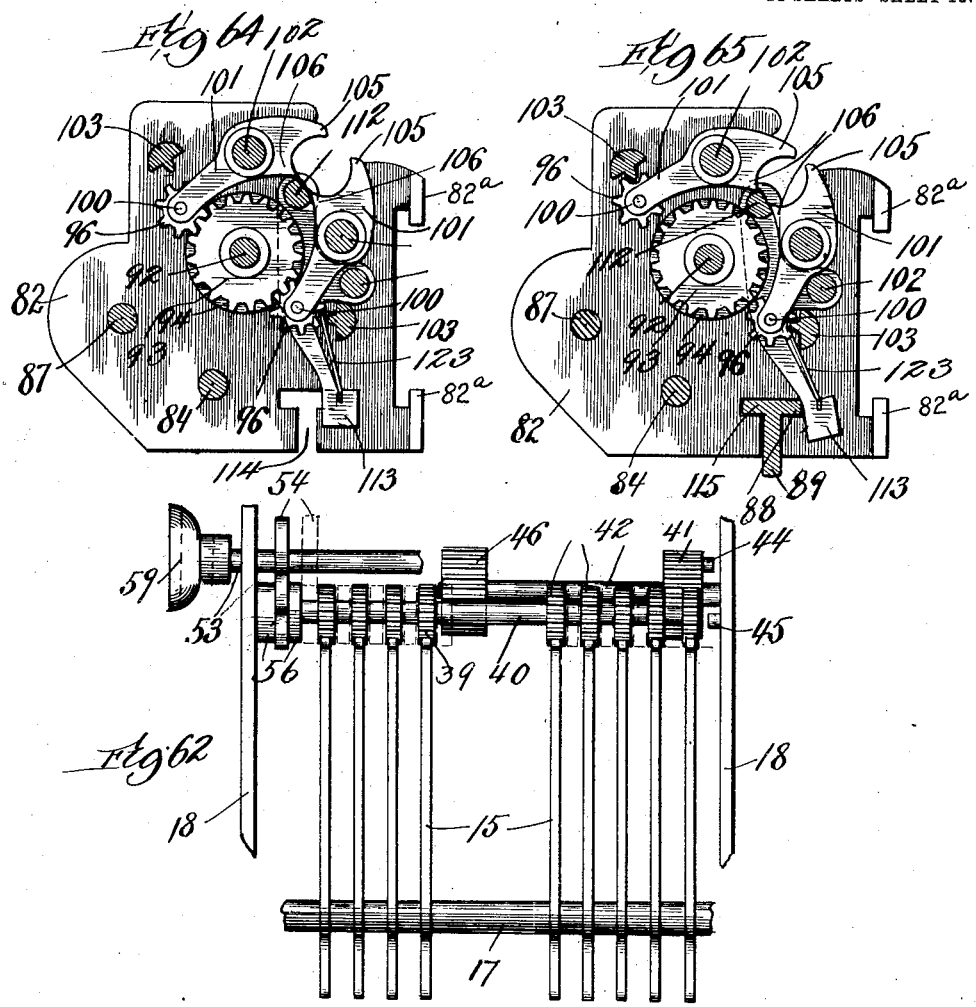

No. 741,961. PATENTED OCT. 20, 1903.
H. E. GOLDBERG.
CALCULATING MACHINE.
APPLICATION FILED JUNE 11, 1902

NO MODEL. 14 SHEETS—SHEET 14.

Witnesses:
Harry R. White
Ray White

Inventor:
Hyman E. Goldberg.
By Jesse & H. M. Cox
Attys.

No. 741,961. Patented October 20, 1903.

UNITED STATES PATENT OFFICE.

HYMAN ELI GOLDBERG, OF CHICAGO, ILLINOIS.

CALCULATING-MACHINE.

SPECIFICATION forming part of Letters Patent No. 741,961, dated October 20, 1903.

Application filed June 11, 1902. Serial No. 111,141. (No model.)

*To all whom it may concern:*

Be it known that I, HYMAN ELI GOLDBERG, a citizen of the United States, residing in the city of Chicago, county of Cook, and State of Illinois, have invented new and useful Improvements in Calculating-Machines, of which the following is a specification.

My invention relates to calculating-machines, and is shown in a form adapted for attachment to a type-writer.

My present machine embodies certain improvements over the machine described and claimed by me in an application filed in the United States Patent Office February 24, 1902, Serial No. 95,342, issued October 7, 1902, as Patent No. 710,772. It is also related to an earlier United States application, filed September 26, 1901, Serial No. 76,680, issued November 4, 1902, as Patent No. 712,518.

The objects of the present invention are, first, to provide means whereby the calculating parts of the machine may be readily thrown into or out of operative engagement with the figure-keys; second, to provide a positive-geared connection between the digit-levers and the mechanism operated by said levers for shifting the master-pinion out of mesh with the part which rotates said pinion; third, to effectually eliminate the danger of overthrow and also the effect of backlash by an improved locking and correcting mechanism; fourth, to facilitate the reversing of the mechanism to change from addition to subtraction, or vice versa, by the lateral shifting of a single narrow-faced pinion; fifth, to increase the range of adjustment of the calculable column of figures on the page; sixth, to provide an auxiliary locking device operative upon the receiving mechanism; seventh, to provide means for supplementing the action of the controlling-bar cams, so that said cams may not impede the travel of the carriage; eighth, to facilitate the calculating of a plurality of columns of figures, and, ninth, to provide means for indicating to the operator when erasing or printing the total what figure-wheel should next be operated upon. This avoids the necessity of examining the printed page. These objects are accomplished by the mechanism illustrated in the accompanying drawings, in which—

Figure 70:
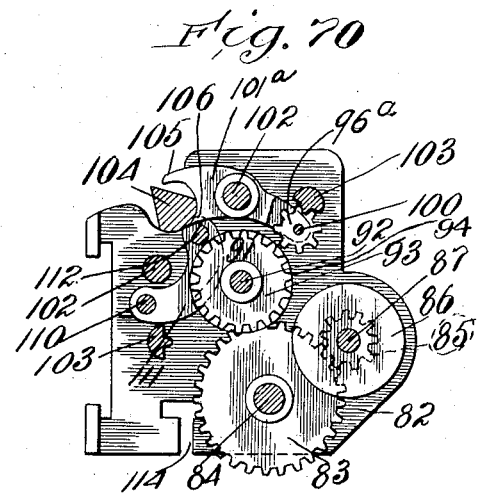
Figure 71:
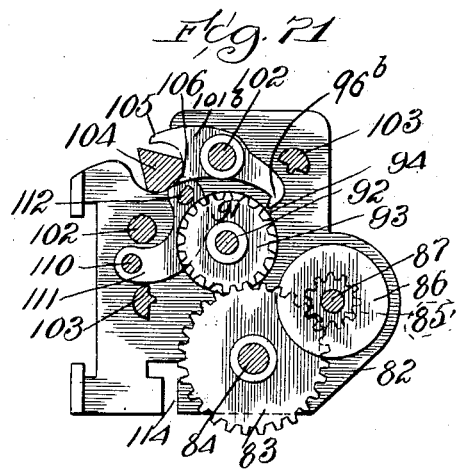

Figure 1 is a front view of the machine inclosed within the outer casings thereof and shown in position upon a type-writer. Fig. 2 is a general sectional view looking in the direction of the arrows on the line A A, Fig. 1. Fig. 3 is a sectional view taken in the direction of the arrows on the irregular line B B, Fig. 1. Fig. 4 is a plan view of the rock-shafts and connected parts of the concentrating mechanism. Fig. 5 is a sectional view taken transversely to the rock-shafts, illustrating the operation of the digit-levers and connected parts. Fig. 6 is a front view of the digit-levers. Fig. 7 is a front view of the slide which carries the receiving mechanism. Fig. 8 is a sectional view looking in the direction of the arrows on the line C C, Fig. 7. Fig. 9 is a sectional view of the slide. Figs. 10, 11, 12, and 13 are diagrammatic views illustrating the operation of the digit-levers and connected parts. Fig. 14 is a front view of the setting and reversing mechanism. Figs. 15 and 16 are front views of the reversing mechanism, showing the two different positions thereof. Fig. 17 is a sectional view on the line D D, Fig. 15. Fig. 18 is a fragmentary view of the reversing-bar. Fig. 19 is a rear view of the setting and reversing mechanism. Figs. 20 and 21 are plan views illustrating the operation of the cams for shifting the master-pinion. Fig. 22 is a face view, and Figs. 23 and 24 are opposite side views, of the inshifting-cam operative upon the master-pinion. Fig. 25 is a face view of the oscillating gear-wheel which drives the master-pinion. Fig. 26 is a side view of the outshifting-cam for shifting the master-pinion. Fig. 27 is a sectional view on the line E E, Fig. 20. Fig. 28 is a plan view showing the valuating mechanism and reversing mechanism. Figs. 29 and 30 are plan views from the rear, showing the operation of the disconnecting device whereby the calculating-machine may be thrown into and out of operative connection with the type-writer. Figs. 31 and 32 are edge and side views, respectively, of the yoke for connecting the two disconnecting-arbors. Figs. 33 and 34 are edge and side views, respectively, of the gear-wheel on the outshifting-cam arbor, showing the stop-pin thereon. Figs. 35 and 36 are front and side views, respectively, of the locking device operative upon the setting-wheel. Figs. 37 and 38 are diagrammatic side views illustrating the operation of the locking device shown in Figs. 35 and 36. Fig. 39 is a fragmentary view of one of the side plates of the machine, showing the spring for retaining the disconnecting device in its shifted position. Figs. 40, 41, and 42 are front, rear, and top views, respectively, of the carrying mechanism. Figs. 43 and 44 are sectional views of the carrying mechanism, illustrating the operation of the rocking frames. Figs. 45 and 46 are sectional views of the carrying mechanism looking in opposite directions. Fig. 47 is a face view of the auxiliary locking device operative upon the rocking frames of the carrying mechanism. Fig. 48 is a sectional detail view of the detent for retaining the carrying mechanism in the proper position upon the slide-bar. Figs. 49, 50, and 51 are different views of the periphery of a carrying-wheel. Fig. 52 is a side view of the carrying-wheel looking in the direction of the arrow, Fig. 49. Fig. 53 is a side view of a single cam-section of a carrying-wheel, and Fig. 54 is a side view of two cam-sections of said wheel, showing the manner in which they combine to form in this instance two overlapping carrying-teeth one hundred and eighty degrees apart. Figs. 55 and 56 are side views of the carrying-wheels and pinions, illustrating the coöperation thereof. Fig. 57 is a face view of the carrying-wheels and pinions, showing the relative positions thereof. Fig. 58 is a face view of a carrying-pinion. Figs. 59, 60, and 61 are sectional views of a carrying-pinion looking in the direction of the arrows on the lines F F, G G, and H H, respectively, Fig. 58. Fig. 62 is a view showing the manner of disconnecting the shift-pinions from the digit-levers. Fig. 63 is a fragmentary view of the disconnecting mechanism. Figs. 64 and 65 are sectional views illustrating the operation of the auxiliary locking mechanism operative upon the rocking frames. Fig. 66 is a front view of part of the controlling-bar. Figs. 67 and 68 are side and edge views of a figure-wheel. Fig. 69 is a detail view showing the correlation of the cams which operate against the collar for shifting the master-pinion. Fig. 70 is a sectional view of the carrying mechanism, taken on the line 70 70, Fig. 40, and shows the extra carrying-pinion, which is fixed in its rocking frame so as to act as a lock or detent for preventing the unwarranted rotation of the units carrying-wheel. Fig. 71 is the same as Fig. 70, except that the detent for the extra carrying-wheel instead of being formed of a carrying-wheel fixed in its rocking frame is shown in the form of a catch or finger formed integral with the rocking frame at the extremity thereof.

Similar numerals refer to similar parts throughout the several views.

For convenience the machine will be considered under the following general headings, to wit: "The concentrating mechanism," which includes the key-action and connected parts for driving the digit-levers; "The valuating mechanism," which transmits motion from the digit-levers to the master-pinion; "The shifting mechanism," for controlling the lateral position of the master-pinion; "The disconnecting mechanism," for throwing the calculating parts into and out of operative connection with the type-writer; "The reversing mechanism," which transmits the motion from the master-pinion to the setting-wheel and determines in which direction the setting-wheel shall rotate; "The locking mechanism," for preventing accidental rotation of the setting-wheel and neutralizing the effect of backlash; "The receiving mechanism," whereby the action of the setting-wheel controls the figure-wheels; "The tens-carrying mechanism," which forms a part of the receiving mechanism and operates to carry the tens to the figure-wheels after they have passed the setting-wheel; "The controlling mechanism," operative upon the carrying mechanism and the slide whereon the carrying mechanism is carried.

In the type-writer, 1 represents the framework; 2, the laterally-movable carriage; 3, the type-writer keys, and 4 the spacing-bar.

*The concentrating mechanism.*—The key-riders 5 are secured to the shanks of such of the keys 3 as represent numerals, and said riders are pivotally connected to the bell-crank levers 6 by means of the links 7, as best shown in Fig. 2. Said crank-levers are provided with a series of apertures for receiving and engaging the upper extremities of said links to provide for adjustment between said levers and the keys 3.

The base-plate 8 of the calculating mechanism is rigidly secured to the type-writer frame and carries the lugs 9, which form bearings for the rock-shafts 10 of the concentrating mechanism. The said lugs also form bearings for the fulcrum-shaft 11. Said crank-levers 6 are loosely mounted on said fulcrum-shaft, so as to be independently revoluble, but laterally non-shiftable thereon. The links 12 are connected at one extremity to said crank-levers 6 and at the other extremity to the rock-shaft arms 13. Said rock-shaft arms are rigidly fastened to the rock-shafts 10, and the parts are therefore so arranged that the depression of one of the figure-keys 3 of the type-writer causes the rotation of the respective crank-lever 6 upon the fulcrum-shaft 11 and the consequent rotation of the respective rock-shaft 10. In the present instance the operative rock-shafts 10 are nine in number, an idle tenth shaft being placed in the mechanism for the sake of symmetry and uniformity in manufacture. Said shafts are arranged in two groups of five each, each shaft having an independent bearing in the center one of the lugs 9 and one of the side lugs 9. Near said center lug each operative rock-shaft 10 carries a rigidly-set digit-lever arm 14, and said arms are connected to their respective digit-levers 15 by means of the links 16.

Figure 11:
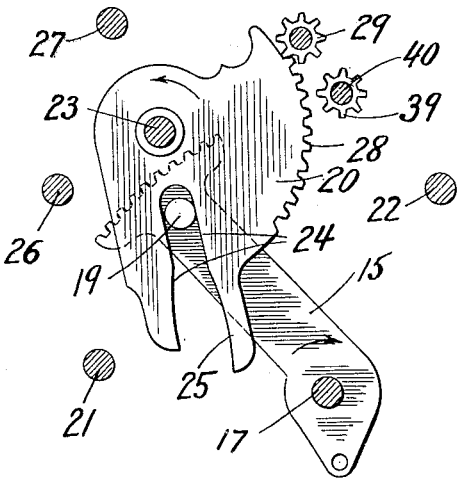
Figure 12:
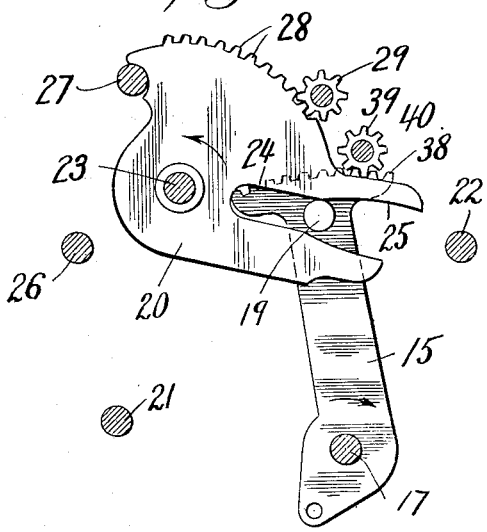
Figure 13:
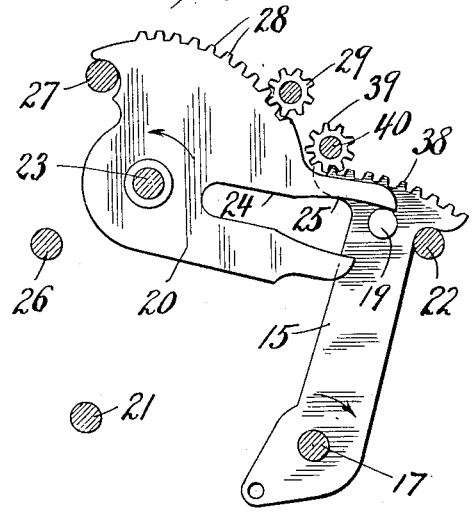

*The valuating mechanism.*—Said digit-levers 15 are loosely mounted on the fulcrum-shaft 17 and prevented from moving laterally thereon by means of the hubs of said levers. Said shaft is rigidly supported in the center one of the lugs 9 and also passes through the plates 18, which form side walls for the machine. Said levers 15 extend in two directions from said shaft 17, one arm being connected to the links 16, as described, and the other arm carrying a pin 19 for actuating the digit-sectors 20. The throw of said levers 15 in one direction is limited by the bar 21 and in the other direction by the bar 22, fixed in the side walls 18. The sectors 20 are loosely mounted upon the fulcrum-shaft 23, which is fixed in the side walls 18, said sectors being prevented from moving laterally upon said shaft by means of their hubs and by means of suitable spacing-collars 23ª or in any other suitable manner. Said sectors are nine in number, one for each of said levers 13. Said sectors are provided with two connecting cam-surfaces 24 and 25. Said surface 24, which forms a slot in said sectors, constitutes a double cam and extends approximately radially, so that when the parts are in normal position, as shown in Fig. 10, said sectors are locked by said pins 19. The cam-surface 25 conforms to the arc of a circle and is so placed that when a sector is in the position shown in Figs. 12 and 13 the center of curvature of said cam-surface is coincident with the center of the shaft 17. The bars 26 and 27 are fixed in the side walls 18 and form stops for limiting the rotation of said sectors 20. The parts are so arranged that when in normal position the sectors 20 are in proximity to the stop-bar 26, the levers 15 are in proximity to the stop-bar 21, and the pins 19 are adjacent to the cam-surfaces 24, all substantially as shown in Fig. 10. The first part of the downward stroke of the type-writer key causes the pin 19 to travel along the cam 24, first moving inward toward the center of the sector 20, as shown in Fig. 11, and subsequently moving outward to the end of said cam, as shown in Fig. 12. When said pin has reached the end of said cam 23, the further rotation of said sector is prevented by the stop-bar 27. At this stage, however, the pin 19 has reached the beginning of the cam 25, which now lies concentric with the path of rotation of said pin. Said pin may therefore continue to move, for example, to the position shown in Fig. 13, so that the throw of the type-writer key is not limited by the digit-sectors 20, but said sector remains locked by said pin 19 until during the return stroke of the type-writer key said pin again reaches the cam 24. By preference said sectors 20 are all of the same general outline and have the same amount of rotation and differ only in the number of teeth with which said sectors are provided. The digit-sector corresponding to the digit "9" has the highest number of teeth, the sector corresponding to the digit "8" has one tooth less, the sector corresponding to the digit "7" has two teeth less than the sector for "9," and so on. These gear-teeth 28 are for the purpose of rotating the digit-pinions 29, which are rigidly fixed upon the pinion-arbor 30. Consequently the amount of rotation of said bar depends on the number of gear-teeth 28 on the temporarily-acting digit-sector. The amount of rotation of the digit-pinion arbor is therefore greatest for the digit "9," is one step less for the digit "8," is another step less for the digit "7," and least of all for the digit "1." There are nine digit-pinions upon said pinion-arbor, one for each digit-sector, as best shown in Figs. 29 and 30. The mutilated gear-wheel 31, which is rigidly set upon the shaft 32, is always in mesh with one of said pinions, and the backward-and-forward rotation of said pinions causes a corresponding backward-and-forward rotation or oscillation of said gear-wheel 31. The master-pinion 33, mounted upon the shaft 34, is both revoluble and laterally shiftable. The shifting of said shaft 34 throws the master-pinion into and out of mesh with said mutilated wheel 31, the object in shifting the master-pinion out of mesh with said mutilated wheel being to permit said mutilated wheel to rotate backward to its initial position without rotating the master-pinion in a backward direction. Said master-pinion rotates in only one direction and does not have a backward-and-forward rotation, as does the mutilated wheel 31.

As illustrated in Fig. 10, the digit-sectors 20 are normally out of mesh with the digit-pinions 29, and in order to prevent accidental rotation of said pinions and gear-wheel 31 at such times a spring 35 is provided, as shown in Figs. 20 and 21. In the arrangement shown the spring is wound around the shaft 32, one end being secured to said shaft and the other end to the adjacent side wall 18. A stop-pin 36 is set in the side of the gear-wheel 31 and is adapted to strike a similar pin 37, set in the adjacent side wall. (See Figs. 20, 21, and 25.) Said stop-pins prevent the rotation of the gear-wheel in one direction, and said spring 35 yieldingly holds said pins in contact, thereby preventing accidental rotation of said wheel 31.

*The shifting mechanism.*—When the machine is in normal position and the typewriter keys are up, the master-pinion 33 is in mesh with the mutilated gear-wheel 31. The devices for shifting the master-pinion out of mesh with said mutilated wheel will now be considered.

Referring especially to Figs. 3 and 12, the digit-levers 15 are shown to be provided with toothed segments 38 at their extremities, which mesh with the shift-pinions 39. Said pinions are rigidly set upon the shift-pinion arbor 40 and are nine in number, corresponding to the number of digit-levers. One of the pinions 39 meshes at all times with the gear-wheel 41, which is rigidly fixed on the shaft 42, as best shown in Fig. 62. In order to prevent accidental rotation of the shaft 42, the spring 43 is provided, one extremity being secured to said shaft and the other extremity to one of the side walls 18. The pin 44 is set in the side of the wheel 41 and is adapted to strike against the pin 45 in the side wall 18, thereby limiting the amount of rotation due to said spring. The cam 46 is rigidly fixed on the same shaft 42 whereon the wheel 41 is fixed. Said cam has a beveled portion 47, adapted to contact the collar 48. (See Figs. 20 and 21.) Said collar is rigidly fixed upon the shaft 34, which carries the shiftable master-pinion 33, and the parts are so arranged that the rotation of the shaft 32 and cam 46 will shift said pinion out of mesh with its mutilated driving-wheel 31. This action is illustrated in Figs. 20 and 21, Fig. 20 showing the normal or initial position in which the master-pinion is in mesh with wheel 31, and Fig. 21 the shifted position in which the pinion is out of mesh therewith.

It is evident by referring to Fig. 3 and Figs. 10 to 13 that the segments 38 on the digit-levers 15 do not engage the pinions 39 until near the completion of the forward motion of the digit-sectors 20. The mechanism is so timed that the cam 47 does not operate upon the collar 48 until after the completion of the forward motion of the sectors 20, and the master-pinion 33 will therefore not be shifted out of mesh until it has completed its rotary motion. The rotary motion and the lateral shifting of the master-pinion occur on the downward stroke of the type-writer key, and consequently if the type-writer key has not been depressed sufficiently far the cam 47 will not have acted upon collar 48 and the master-pinion 33 will not have been shifted out of mesh with wheel 31. Consequently on the upstroke of the type-writer key both wheel 31 and master-pinion 33 will rotate back to their former positions without having produced any effect upon the remainder of the mechanism. Thus the depression of a type-writer key results in either the setting up of the proper digit or else has no effect at all.

The device for shifting the master-pinion back into mesh with the wheel 31 comprises the cam 50, which is rigidly set on the shaft 32, the same shaft which is rotated by the mutilated gear-wheel 31. Said cam has a beveled portion 51, which when the cam is rotated comes into contact with the collar 48 and shifts the pinion back into mesh with said mutilated gear-wheel. Said beveled portion 51 is so timed as to operate near the end of the upstroke of the type-writer key, so that the master-pinion may be in mesh in readiness to be driven when the next key is struck. In order that the wheel 31 shall not interfere with the master-pinion while the latter is being shifted to a position to mesh with said wheel 31, said wheel has a portion 52 of its toothed face cut away. This mutilation of wheel 31 to produce the non-interference space 52 is illustrated in Figs. 21 and 25. Of course this mutilation of the wheel 31 results in a lost motion at the beginning of the forward stroke of said wheel—that is to say, there will be no rotation of the master-pinion until the wheel 31 has rotated forward an amount equal to the space from which the teeth have been cut. Due allowance is made for such lost motion—for example, if three teeth are cut away from the wheel 31 as being necessary for the action of the cam 50 to shift the master-pinion into mesh then the wheel 31 rotates a space of three more teeth than is required of the master-pinion in the setting up of any given digit. In operation therefore the wheel 31 rotates backward and forward, while the master-pinion rotates only forward, and the forward and also the backward rotation of wheel 31 always exceeds the rotation of the master-pinion by an amount equal to the non-interference space on said wheel 31.

*The disconnecting mechanism.*—It is desirable that the calculating parts of the machine may be readily thrown out of connection with the type-writing parts when no numerical calculations are required. The devices for attaining this object will now be described.

Referring to Figs. 29, 30, 62, and 63, the arbors 30 and 40, bearing, respectively, the digit-pinions 29 and shift-pinions 39, are not only revoluble, but are laterally shiftable. There is a space between each two adjacent pinions on said arbors, so that when said arbors are shifted the pinions 29 will all stand aside out of mesh with their respective digit-sectors 20, as illustrated in Fig. 30, and in a similar manner the pinions 39 will stand aside out of mesh with their digit-levers 15. The shifting of said arbors is accomplished by means of the disconnecting-bar 53. Said bar is laterally shiftable and is connected to the arbors 30 and 40 through the yoke 54. (See Figs. 32 and 63.) The yoke is rigidly fixed on the bar 53 and straddles said arbors between the collars 55 on the arbor 30 and collars 56 on the arbor 40. Said collars do not bind the yoke, and as a result the yoke controls said arbors laterally, but does not prevent their free rotation. In order to retain the pinion-arbors 30 and 40 in either of the shifted positions, two notches 57 (see Fig. 31) are cut upon the bar 53, and a spring 58, fastened to the adjacent side wall 18, snaps into one of said notches. This disconnecting device is an important feature of the machine, because by simply pressing the buttons 59 with which the disconnecting-bar 53 is provided the pinions 29 and 39 may be shifted into or out of operative position, and when said pinions are out of operative position the depression of a type-writer key will have no effect upon the calculating mechanism. The digit levers and sectors will oscillate in response to the action of their respective keys but will transmit no motion to the other parts of the machine.

*The reversing mechanism.*—It has been above stated that the shiftable master-pinion 33 always rotates in the same direction; but in order that the calculating-machine may be capable of performing both addition and subtraction means are provided for reversing the effect of the master-pinion upon the carrying mechanism. Briefly stated, this is accomplished by varying from odd to even, or vice versa, the number of gear-wheels actively interposed at any given time between the master-pinion and the carrying mechanism. The device here employed for this purpose is best shown in Figs. 15 to 18. The gear-wheel 62 is rigidly set upon the revoluble and laterally-shiftable shaft 61. Said wheel is so placed and the master-pinion 33 is of such width that said wheel and pinion are at all times in mesh. A gear-wheel 63 is mounted upon the shaft 64 in such a manner as to be revoluble, but laterally fixed. The location of said wheel 63 is such that when the wheel 62 is in one shifted position wheels 62 and 63 are in mesh and when wheel 62 is in the other shifted position wheels 62 and 63 are out of mesh. The two wheels 65 and 66 are both rigidly mounted on the revoluble but laterally-fixed shaft 67. Wheel 65 is at all times in mesh with wheel 63. The wheel 62 may be shifted to be in mesh with either wheel 63 or wheel 66. The setting-wheel 68, which is mounted upon the shaft 69 in such a manner as to be revoluble, but laterally fixed, is always in mesh with the laterally-fixed wheel 63. In operation the master-pinion 33 drives the wheel 62, and the wheel 62 drives either the wheel 63 or 66, depending upon the shifted position of wheel 62. Now if wheel 62 is in mesh with 63 then 63 will rotate in one direction; but if wheel 62 is in mesh with wheel 66 then 63 will be driven by the wheel 65, and consequently will rotate in the opposite direction. In other words, if wheel 63 is driven directly by wheel 62 it will rotate in one direction; but if wheels 65 and 66, which rotate as a single piece and virtually constitute a single wheel, are interposed then 63 will rotate in the opposite direction. Thus the lateral position of the shiftable wheel 62 determines the direction of rotation of the wheel 63, and consequently of the setting-wheel 68. It will be understood that wheels 65 and 66 rotate whenever wheel 63 rotates; but when 62 is in mesh with 63 then 65 and 66 will rotate idly and will have no effect upon any part of the mechanism. The shifting of the wheel 62 reverses the direction of rotation of the setting-wheel 68, and therefore determines whether the machine shall add or subtract. Such shifting is necessary only when it is desired to change from addition to subtraction, or vice versa, and such shifting is done by hand by means of the following devices.

Referring to Figs. 15 and 16, the reversing-bar 70 is mounted in the side walls 18, so as to be laterally shiftable, and the push-buttons 71 on the outside of said walls serve as stops to limit the shifting of said bar. The yoke 72 is rigidly secured to said reversing-bar and straddles the shaft 61 between the collars 73. Said collars are rigidly set upon said shaft 61, but do not bind the yoke, so that said shaft is free to revolve, but is controlled in its lateral position by the bar 70. In order to retain the reversing-bar in either of its shifted positions, two notches 74 (see Figs 17 and 18) are cut therein, and one portion of the spring 58 (shown in Figs. 3 and 39) snaps into one of said notches. Thus by simply pressing one of the buttons 71 the machine may be changed from an adding to a subtracting machine, or vice versa.

*The locking mechanism.*—Although the master-pinion and setting-wheel are always in gear with each other, there are several wheels interposed between them, and in order to overcome the effect of excessive play or backlash a locking mechanism is provided. This locking mechanism consists of the rock-shaft 75 and the arms rigidly carried thereon. (Best shown in Figs. 35 to 38.) The locking-arm 76 on said shaft has its outer extremity adapted to enter between the teeth of the master-pinion 33, and in a similar manner the arm 77 is adapted to engage the setting-wheel 68. The outer extremities of said locking-arms are wedge-shaped and in moving into engagement with their respective wheels come obliquely into contact with the teeth thereon, thereby tending to force the wheels slightly ahead or backward in case said wheels have not been rotated to exactly the right position. After said wedge-shaped extremities have entered between the teeth the wheels become locked. Thus the locking mechanism has the double function of correcting the wheels and locking them. Said locking-arms 76 and 77 are normally held out of engagement with the master-pinion and setting-wheel by means of the spring $77^a$. (Shown in Fig. 3.) In order to prevent the locking-arms from being withdrawn too far, the arm 78 is secured to said shaft 75 in such a position as to strike against the pin 79, set in the adjacent side wall, as shown in Fig. 35. The rock-shaft 75 is operated to throw the arms 76 and 77 into mesh with their respective wheels by means of the arms 80 and 81, operated by the cams 46 and 50, respectively. Said cams have double functions—that is to say, each has two working faces, one for shifting the master-pinion 33 in the manner previously described and one for operating its respective arms. The pinion 33 and wheel 68 are unlocked only when the cams 46 and 50 release their respective arms 80 and 81. The parts are so timed that when the machine is in normal condition or at rest the cam 50 is in contact against the arm 81 and holds the locking-arms in locked position. When the type-writer key is struck, the cam 50 is the first to rotate, and it releases its arm in time to permit the driving of the wheels 33 and 68. After said wheels have completed their rotation, the cam 46, which has heretofore been out of contact with the arm 80, now comes into contact therewith and throws the locking-arms back into contact with their wheels, thereby correcting and locking the same. The said wheels are thus unlocked just before they are to be rotated and relocked just after they have completed their rotation.

*The receiving mechanism.*—The receiving mechanism (shown separately in Figs. 40 to 46) is not attached to the stationary side walls 18, but is independent thereof, being mounted in a separate laterally-shiftable frame which in the present machine is located above the working parts hereinabove described. The side walls 82 of the carrying mechanism are mounted, by means of the lugs 82ᵃ, so as to slide laterally with the motion of the type-writer carriage. The receiving-wheels 83 are loosely mounted on the shaft 84, which is fixed in the side walls of the carrying mechanism. Said receiving-wheels are free to rotate upon said shaft, but are prevented from moving laterally thereon and are placed equidistant from each other, their distance apart being equal to one complete step of the type-writer carriage. The receiving-wheels are so placed that they will be brought into mesh with the setting-wheel 68 one after the other—that is to say, the escapement of the type-writer carriage one full type-space will bring the next adjacent receiving-wheel into mesh with said setting-wheel. The number of receiving-wheels is equal to the number of figure-wheels of the mechanism and determines the value of the highest number which can be shown on the machine. The wheels 83 mesh with the gear-wheels 85, one of said wheels 85 being secured to each of the figure-wheels 86 for rotating the latter. Said figure-wheels (shown separately in Figs. 67 and 68) are loosely mounted on the shaft 87, but are prevented from sliding laterally thereon. Said figure-wheels carry on their periphery a series of numerals or digits for registering in the manner common to calculating-machines. In the present machine each figure-wheel has ten figures, and each gear-wheel 85 has ten teeth.

As above stated, the receiving mechanism moves with the type-writer carriage, and the movement of the carriage is from left to right looking at the front of the type-writer, as in Fig. 1.

In order that each receiving-wheel 83 may be locked prior to the time when it comes into mesh with the setting-wheel 68, a fin 88 is provided on the stationary plate 89, as best shown in Fig. 1. Said fin engages the teeth of said receiving-wheels and locks the same during the time when said wheels are opposite said fin. Said fin lies to the right of the position occupied by the setting-wheel 68 and terminates at a point such that any given receiving-wheel is released from said fin just before coming into mesh with said setting-wheel. By this construction the receiving-wheels are locked by said fin until they are engaged by said setting-wheel. In order to eliminate the effect of looseness or backlash in the gearing and to complete the effect of the said wheel 68, said receiving-wheels are alined or corrected after leaving said setting-wheel by means of the pin 90, which engages said receiving-wheels momentarily as they leave said setting-wheel. Said pin 90 extends only a short length, so that one receiving-wheel is disengaged therefrom by the time the next succeeding receiving-wheel is in mesh with the setting-wheel.

The tens-carrying mechanism for transmitting the proper rotation to the figure-wheels after they have passed the setting-wheel 68 will now be described. In this mechanism the carrying-wheels, carrying-pinions, and rocking frames are practically the same as shown in the application above mentioned, filed February 24, 1902, Serial No. 95,342. Each receiving-wheel 83 meshes with its respective carrying-wheel 91. Said carrying-wheels are loosely mounted upon the shaft 92, but are laterally immovable thereon. Said shaft is rigidly supported in the walls 82. Said carrying-wheels (shown separately in Fig. 49 and adjacent figures) are composed of three sections 93, 94, and 95, which may be cut from a single block or formed separately and afterward secured together to act as a single piece. Looking from the front, as in Fig. 49, the section 93 lies upon the right and consists of a complete toothed gear-wheel. The number of teeth on said section 93 is a multiple of twenty, the present wheel having twenty teeth. The section 95 at the left is a counterpart of the section 94 in the middle and consists of a disk having a circular periphery divided into two parts of different diameter. The portion of greater diameter corresponds to the point-circle and the portion of smaller diameter corresponds to the root-circle of a toothed gear-wheel. The point-circle portion of each of said disks exceeds a semicircumference by the space of one tooth, and said sections 94 and 95 are so arranged in the carrying-wheel that said point-circle portions overlap each other an area equal to two teeth. These overlapping areas constitute carrying-teeth and are located one hundred and eighty degrees apart, as shown, for example, in Figs. 54 to 56. The tens-carrying pinions 96 (shown in Figs. 58 to 61) are also formed in three sections 97, 98, and 99, acting as a single piece. Looking from the front the section 97 is located at the left and consists of a complete toothed gear having an even number of teeth, the present number being eight. Section 99 on the right is a counterpart of section 98 in the middle, which is a gear-wheel like the wheel 97, except that each alternate tooth is lacking. In the present machine each of the sections 98 and 99 have four teeth like those of the section 97; but the arrangement is such that the teeth on the section 98 are adjacent to the spaces caused by the missing teeth on the section 99. The teeth on the center section 98 are continuous with the teeth on the section 97, so that when viewed in the direction of the arrows, Fig. 58, the carrying-pinions have the appearance of an eight-toothed gear-wheel having a full complement of teeth. Said pinions are adapted to mesh with the carrying-wheels 91 and are so placed relatively thereto that the sections 98 and 99 of any given pinion engage with the sections 95 and 94, respectively, of the carrying-wheel, but the section 97 of said pinion engages with the section 93 on the next carrying-wheel to the left, as shown in Fig. 57. In other words, each carrying-pinion engages two different carrying-wheels, and the rotation of any given carrying-wheel is carried to the next adjacent carrying-wheel on the left through the agency of their common carrying-pinion. When a carrying-pinion is in engagement with its carrying-wheels and the point-circle portion of a section 94 is adjacent to a pinion-section 99, said point-circle portion enters between two teeth on said section 99 and prevents the rotation thereof, as shown in full lines in Fig. 56. At this time a tooth on the section 98 of said pinion is next to the root-circle portion of the section 95 and is therefore in position to be engaged by the approaching point-circle portion of said section 95, as shown in dotted lines, Fig. 56. As the point-circle portion of section 95 engages the tooth of section 98 the point-circle portion of section 94 simultaneously releases section 99. The passing of one carrying-tooth on the carrying-wheel therefore causes the carrying-pinion to rotate one tooth-space. It is thus evident that the carrying-wheels alternately lock and rotate the carrying-pinions, the rotation of a pinion occurring when a carrying-tooth passes said pinion. Inasmuch as said pinion is in mesh with the next higher carrying-wheel, the rotation of any given carrying-wheel is thus communicated to the next higher carrying-wheel, thereby carrying the tens. Each carrying-pinion is mounted upon an independent shaft 100, supported in its rocking frame 101. Said pinions are loose upon their shafts 100, but are prevented from moving laterally thereon by the forked extremities of said frames. (Best shown in Figs. 40 to 42.) Said frames are arranged in two series or gangs pivoted upon the shafts 102 102 in such a manner that the carrying-pinions 96 lie alternately on opposite sides of the carrying-wheels 91, as best shown in Figs. 43 to 46. Said shafts 102 are fixed in the walls 82. By means of said rocking frames the said carrying-pinions are swung into and out of mesh with the carrying-wheels 91. When said pinions are out of mesh, they are prevented from rotating by means of the fixed locking-bars 103 in the manner shown in Fig. 44. The object in locking the pinions when they are swung away from the wheels is to hold the pinions so that when they are swung toward the wheels they will come into mesh readily and avoid the danger of having the top of a pinion strike against the top of a wheel-tooth.

*The controlling mechanism.*—The position of any rocking frame radially about its pivot for swinging the pinions 96 toward or from the carrying-wheels 91 is determined by the cross-section of the bar 104 at the particular point at which said frame is for the moment located. Said bar is best shown in Figs. 1, 3, and 66 and is stationary, being rigidly connected to the frame of the type-writer. Said controlling-bar has two kinds of cross-sections. At one cross-section the toes 105 of the rocking frames are held at their farthest distance from the central axis of said bar, while the bar is cut away for non-interference with the toes 106, thus holding the carrying-pinions in mesh with the carrying-wheels, as shown in Fig. 43. At the other cross-section the toes 106 are held at their farthest distance from the central axis of said bar, while said bar is cut away for non-interference with the toes 105, thus holding the pinions out of mesh with the carrying-wheels, as shown in Fig. 44. Of course at the point where the cross-section of bar 104 changes the change is made gradually by means of short bevels, so that the toes of the rocking frames may readily glide thereon in passing from one portion of the bar to the other. As hereinbefore stated, each carrying-pinion is adapted to engage two carrying-wheels, and therefore when the pinions are in mesh with the wheels the wheels are in reality all geared together through the medium of the pinions. Now in order that the rotation of any given carrying-wheel may not disturb the wheels to the right thereof bar 104 is so constructed that while any given carrying-wheel is being rotated by the setting-wheel the carrying-pinion connecting with the next carrying-wheel on the right will be out of mesh. In other words, the controlling-bar so controls the position of the rocking frames and carrying-pinions that the tens will be carried to the left of the momentarily-acting receiving-wheel, but the receiving-wheels to the right which have not yet come into action will not be disturbed. The construction of the receiving mechanism is such that when all the carrying-pinions are in mesh with their carrying-wheels the mechanism becomes a counting mechanism, and in such case all the figure-wheels are locked when any one is locked. The parts are so timed that when any given carrying-wheel is in mesh with the setting-wheel the carrying-pinion connecting to the next carrying-wheel to the right is out of mesh and all the carrying-pinions connecting to the carrying-wheels to the left are in mesh. Thus there is no disturbance of the carrying-wheels having lower digital place values than the carrying-wheel temporarily engaged by the setting-wheel; but the tens may be carried to the wheels having higher digital place values. The range of travel of the receiving mechanism is so great as to render it impractical to make the controlling-bar or the plate 89 long enough to serve as a lock for the receiving mechanism throughout the entire extent of its travel. An auxiliary locking device has therefore been provided, which is constructed as follows, reference being had to Figs. 43 to 47 and Figs. 64 and 65: The pivot-bar 110 is revolubly mounted in the side walls 82 of the receiving mechanism and carries the arms 111 111. The auxiliary locking-bar 112 is so mounted on said arms 111 as to engage the toes 106 of the rocking frames for forcing the carrying-pinions 96 into mesh with the carrying-wheels 91. One of the arms 111 has an extension 113, which controls the position of the bar 112 and is acted upon by a spring 123 in such a manner that said extension tends to lie across the slot 114 in the side walls 82. The plate 89 has a flange 115 extending rearward and adapted to enter said slot 114, so as to force the extension 113 aside. The forcing of said extension aside causes the auxiliary locking-bar 112 to swing away from the toes 106, thereby permitting the carrying-pinions to be thrown out of mesh with the carrying-wheels. In the operation of the auxiliary locking device the spring 123, acting upon the extension 113, causes the bar 112 to act against the toes 106 and hold the carrying-pinions in mesh with the carrying-wheels. This is the normal condition, so that the carrying-wheels are always locked unless the locking-bar 112 is forced away from the toes 106.

It is apparent that when the carrying-pinions are all in mesh with their carrying-wheels said wheels and pinions constitute a geared counting mechanism, and the rotation of any one of said wheels or pinions will cause rotation of all of said wheels and pinions. It is equally true that if one of said wheels or pinions is prevented from rotating all will be prevented from rotating. Inasmuch as the units-carrying wheel is the last one to be rotated by the figure-keys in setting up a number, said units-carrying wheel will best serve the purpose of locking all of the carrying-wheels prior to the time when their respective carrying-pinions are to be raised therefrom to permit rotation. Consequently a detent is applied to said units-carrying wheel, which is located at the extreme right of the set. A suitable manner of constructing this detent is shown in Fig. 71, in which 96$^b$ represents a finger or catch adapted to engage the teeth of the units-carrying wheel 91. Said finger is formed at the extremity of the rocking part 101$^b$, which is preferably of the same form, construction, and operation as the working frames 101. The parts are so arranged that said finger-detent 96$^b$ will remain in engagement with the units-carrying wheel until the moment when said wheel is to be rotated. Therefore as a result of the action of said finger-detent the units-carrying wheel and all of the carrying-wheels located at the left thereof will remain locked as long as their respective carrying-pinions engage them; but the forming of the finger-detent upon the rocking part 101$^b$ necessitates the making of a special piece, and for reasons of manufacture it is undesirable to do this. Consequently instead of forming a piece 101$^b$ having a finger 96$^b$ thereon I prefer to employ a rocking frame 101$^a$ like the rocking frame 101 and rigidly fasten therein, by brazing or other suitable means, a pinion 96$^a$ like the carrying-pinions 96. The teeth of pinion 96$^a$ engage the teeth of the units-carrying wheel, and as said pinion is non-rotatably fastened in frame 101$^a$ said pinion and frame act as a single piece and serve as a lock or detent for said units-carrying wheel.

There are two agents which may force the locking-bar 112 in a direction against the force of the spring acting on extension 113. One agent is the controlling-bar 104, which operates positively upon the toes of the rocking frames, and the other agent is the flange 115 on the plate 89. Now the flange would not be required if it were not for the fact that the controlling-bar must operate decisively at a definite part of the bar between rather short limits, and consequently the change from one cross-section to the other is somewhat abrupt. This abruptness might form an impediment to the travel of the type-writer carriage, and hence the flange 115 is provided, which has a slow bevel or taper at the ends, and thus relieves and supplements the action of said bar during the travel of the type-writer carriage. Inasmuch as the normal position of the locking-bar 112 is such that the carrying-pinions are in mesh with and lock the carrying-wheels, it follows that the receiving mechanism may be completely removed from any or all of its supporting parts and from the plate 89 and from the bar 104 without danger of the figure-wheels rotating from the position in which they were last set by the operation of the figure-keys.

*The slide.*—The receiving mechanism is slidingly mounted, so that it may be moved laterally by the type-writer carriage, and the mountings and the connections to the type-writer carriage will now be considered.

The side walls 82 of the receiving mechanism are provided with lugs 82$^a$ for fitting over the flanged edges of the slide 116. Said walls are adjustable laterally upon said slide, as will be explained; but during the regular operation of the calculating-machine the receiving mechanism occupies a fixed position on the slide, while the latter slides within the stationary slideway 117. Said slideway, which is rigidly connected to the frame of the type-writer, is recessed to receive suitable extensions on the slide 116 and is open at the ends, so that the slide may be withdrawn. The connection between the slide and the type-writer carriage (best shown in Figs. 1, 2, and 7) consists of an arm 118, fixed to the carriage and extending down so as to enter the socket 119, fixed on the slide. The socket has parallel walls extending fore and aft, which loosely engage the lower extremity of the arm, so that the same is free to move fore and aft when the carriage is shifting from lower to upper case type. This construction also has the advantage of permitting the slide to be readily disconnected when not required or when the carriage is to be raised for viewing the printed page.

The present machine is shown to be provided with twelve figure-wheels, which enables the machine to compute numbers having twelve digital places. In operations requiring a calculating mechanism the numbers to be computed are ordinarily printed in vertical columns, which columns may be located on any spot of the paper. The receiving mechanism is therefore made adjustable on the slide, (and therefore relatively to the sheet of paper in the type-writer carriage.) The columns in order to be computed while being printed must lie in such a position on the sheet that the type will print in the units-column at the same time that the units-figure wheel is being operated by the setting-wheel. By varying the position of the receiving mechanism on the slide the positions of the calculable columns on the printed sheet may be varied. The device for thus adjusting the receiving mechanism consists of a lever 120, pivoted on one of the shafts 102, as best shown in Figs. 45, 46, and 48. One extremity of said lever projects out far enough to be operated by hand, while the inner extremity of said lever has a finger 121 for entering any one of the row of apertures 122, provided in the slide. A spring 120ª acts upon said lever to normally retain the finger in one of the apertures of the slide. By the construction shown it will be readily understood that two or more receiving mechanisms may be employed, thus enabling the machine to calculate two or more columns of numbers. For the purpose of protection suitable casings inclose the working parts of the receiving mechanism and also the parts within the side walls 18.

To operate the machine to print and compute a series of numbers in a column, the type-writer carriage is brought by the operator to such a position that the first figure of the number will occupy its proper digital position—that is to say, will have its proper place value. The units will occur at the extreme right of the column on the printed page, tens in the next place to the left, hundreds in the third place, and so on. Inasmuch as the carriage and receiving mechanism travel from right to left, the units-figure wheel, which is located at the extreme right of the gang of figure-wheels, will be the last one to be in gear with the setting-wheel 68. As a result of the configuration of the controlling-bar 104 when the units-figure wheel is in gear with the setting-wheel all of the carrying-pinions 97 are in mesh with their respective carrying-wheels, so that the tens will be properly carried. Suppose that the number "876" appears on the printed page and also on the figure-wheels and that the number "57" is to be added—

876
57
———
Result...... 933

The operator sets the type-writer carriage so that when the "5" key is struck the character "5" will be printed on the page in the tens-column. This setting in the carriage brings the receiving mechanism to such a position that the tens-figure wheel is in direct gear with the setting-wheel. When the operator strikes the key, the "5" is printed on the page beneath the "7" and the tens-figure wheel is rotated five spaces, thereby causing it to show "2," while the carrying mechanism rotates the hundreds-figure wheel one space, so as to show "9." In reality, as far as the calculating mechanism is concerned, fifty has been added to "876," and the figure-wheel now shows "926," the units-figure wheel having remained unchanged. The action of printing the figure causes the type-writer carriage to travel to the next type-space, and consequently causes the receiving mechanism to travel so that the units-figure wheel will be in direct gear with the setting-wheel. The operator now strikes the "7" key, which causes the type-writer to print "7" beneath the "6" and also causes the units-wheel to rotate seven spaces. This amount of rotation causes said units-wheel to show "3," while the carrying mechanism causes the tens-figure wheel to rotate one space, so as to also show "3." The figure-wheels now show "933," which is the total sum of the numbers given for computation. If other numbers are to be added, the procedure is the same, the figure-wheels showing the complete results as the printing progresses. In subtracting the operation of the parts included between the type-writer keys and the receiving-wheels is the same as in addition, with the exception of the operation of the reversing-gear. For subtraction the reversing-bar 70 is shifted by pressing one of the buttons 71, which reverses the direction of rotation of the setting-wheel 68. This causes every wheel in the receiving mechanism to reverse the direction of its rotation, and the mechanism therefore performs subtraction instead of addition. While the numbers are being printed the result can always be seen and read on the receiving-wheels. When the last number has been printed, the total result can be seen in the same place. Should the operator wish to print that result and yet preserve it on the receiving-wheels for corroboration, he presses the disconnecting-button (thus completely disconnecting the calculating mechanism from the typewriter) and prints the result. Should the operator wish to print the total and simultaneously reset the figure-wheels to zero, the reversing-bar 70 is set for subtraction. The type-writer carriage is then shifted to such a position that the setting-wheel is in gear with the figure-wheel having the highest value found in the result. The number corresponding to the result is then struck on the figure-keys in the usual manner, and as the setting-wheel now subtracts the figure-wheels are brought back to zero. It is apparent, therefore, that the act of printing the result brings the figure-wheels to zero if the machine be set for subtraction. Should the operator have misread the total on the figure-wheels and printed an incorrect total while the mechanism was set for subtraction, then the receiving mechanism will not return to zero, but some number will be left appearing on the figure-wheels. The fact that a number is thus left on the figure-wheels proves that the operator has misread the total, and the number thus appearing shows the amount of the error. When computations are not required, the disconnecting-bar 53 is shifted so as to throw the pinions 29 and 39 out of mesh with the digit-sectors and digit-levers. The arm 118 may also be withdrawn from the socket 119 and the slide shifted to one side or completely removed, so as not to interfere with the travel of the carriage. The type-writer keys may then be struck without affecting the calculating mechanism beyond the digit-sectors and digit-levers, and the type-writer carriage may travel back and forth without moving the receiving mechanism or slide.

It will be understood that a line of figures will appear at all times on the figure-wheels, and in order that the operator may be positively informed as to what figure-wheel should next be operated upon a pointer 124 is provided. This pointer is secured to the slideway 117 or other fixed part of the machine and extends to a point adjacent to the figure-wheels, as shown in Figs. 2 and 3. Said pointer is shown to be removed in Fig. 1 in order that the view of the figure-wheels and other parts may not be obstructed. In operating the machine when the pointer points to a certain figure of the number appearing on the figure-wheels the operator knows that the figure-key corresponding to that figure must be struck next. This avoids the necessity of examining the printed page.

It may occur that the operator should wish to repeat an operation or perform independent operations on the calculating mechanism without printing. In this case he will raise the type-writer carriage far enough so that the type will not strike the paper and the mechanism then becomes a simple but complete calculating-machine.

What I claim as new, and desire to secure by Letters Patent, is—

1. In a calculating-machine, the combination of a shiftable master-pinion, and digit-levers connected to said pinion for rotating the same, said levers also having a second connection with said pinion by means of teeth on said levers for shifting said pinion after the completion of the rotation thereof.

2. In a calculating-machine, the combination of a shiftable master-pinion for setting up the digits, means for shifting said master-pinion in one direction, a cam for shifting said master-pinion in the opposite direction, a toothed gear for rotating said cam, and a key-actuated digit-lever having a toothed segment for driving said toothed gear.

3. In a calculating-machine, the combination of a shiftable master-pinion for setting up the digits, means for shifting the master-pinion in one direction, key-actuated digit-levers having toothed segments, shift-pinions driven by the segments on said levers, and connections between said shift-pinions and said master-pinion for shifting the same in the opposite direction.

4. In a calculating-machine, the combination of a shiftable master-pinion for setting up the digits; cams for shifting said pinion; two sets of shift-pinions for operating said cams; key-actuated digit-levers; and sectors driven by said levers, said sectors and levers having teeth for driving their respective shift-pinions.

5. In a calculating-machine, the combination of a shiftable master-pinion for setting up the digits, two cams for shifting the same in opposite directions, two sets of pinions each set operative upon its respective cam, key-actuated digit-levers having teeth for driving one of said sets of pinions and means for driving the second set of pinions.

6. In combination, the oscillating gear-wheel, the master-pinion shiftable into and out of mesh therewith, the inshifting-cam, the set of pinions for driving the same, the sectors for driving said set of pinions, the outshifting-cam, the set of pinions for driving the outshifting-cam, and the toothed digit-levers for driving said sectors and second set of pinions.

7. In a calculating-machine, the combination of a series of key-driven gears and a series of laterally-shiftable pinions rigidly secured together and rotating as a single piece, there being one of said pinions for each of said gears; and means for laterally shifting said pinions simultaneously to thereby break the operative connection between said pinions and said gears.

8. In a calculating-machine, the combination of a master-pinion for setting up the digits, two laterally-shiftable arbors, for operating said pinion, toothed members for driving said arbors, and means for altering the positions of said arbors relatively to said toothed members to thereby disconnect said arbors from said toothed members.

9. In a calculating-machine, the combination of key-actuated digit-levers, digit-sectors driven by said levers and two shiftable arbors for setting up the digits, one of said arbors being driven by said levers, and the other of said arbors being driven by said sectors, and means for shifting said arbors to thereby disconnect the same from said levers and sectors.

10. In a calculating-machine, the combination of a shiftable master-pinion, two cams for shifting the same, toothed digit-levers, toothed digit-sectors, and toothed gears connecting one of said cams to said levers and the other of said cams to said sectors, said sectors being operated by said levers, and said master-pinion being rotated by said sectors.

11. In a key-operated calculating-machine, a mechanism for disconnecting the keys from the rest of the machine, said mechanism comprising a set of toothed members, one for each figure-key, a pinion for each of said toothed members, an arbor whereto said pinions are rigidly fixed, and means for shifting said arbor to disconnect said pinions from said toothed driving members.

12. In a calculating-machine, a traveling registering mechanism comprising carrying-wheels, carrying-pinions, rocking frames for throwing said pinions into and out of mesh with said carrying-wheels, and a rocking detent acting upon the registering-wheel having the lowest place value.

13. In a key-operated calculating-machine, a locking mechanism comprising a plurality of arms fixed to and operated by a single shaft and each of said arms engaging different parts of the machine for locking and correcting the same; means operative upon said shaft to throw said arms into engagement at the end of the downstroke of the key; other means operative upon said shaft to throw said arms into engagement at the end of the upstroke of a key; and other means for throwing said arms out of engagement with their respective parts.

14. In a receiving mechanism, a series of carrying-wheels, a series of swinging carrying-pinions meshing therewith, a detent for locking the lowest of said carrying-wheels, and means for simultaneously throwing said detent and said carrying-pinions into mesh with said carrying-wheels to thereby lock said wheels.

15. In a calculating-machine, the combination of a traveling registering mechanism, arms pivotally mounted upon said registering mechanism, a locking-bar carried by said arms and engaging and disengaging all of the registering parts simultaneously, and means for operating said arms.

16. In a calculating-machine the combination of a traveling registering mechanism, a locking-bar operative thereon and traveling therewith, said locking-bar normally locking the entire series of registering parts simultaneously, and a fixed plate for releasing said locking-bar during the travel thereof past said plate.

17. In a calculating-machine, the combination of a traveling registering mechanism, a fixed controlling-bar having cams or bevels for locking and unlocking said registering mechanism at definite points in the travel thereof; an auxiliary locking device for normally locking said registering mechanism; and a fixed plate having a beveled edge for releasing said auxiliary device to permit the operation of said controlling-bar.

18. In a calculating-machine, a traveling registering mechanism comprising carrying-wheels, carrying-pinions and rocking frames for throwing said pinions into and out of mesh with the carrying-wheels; in combination with a fixed bar for controlling said frames; an auxiliary locking-bar traveling with said registering mechanism and also operative upon said frames to throw the carrying-pinions into mesh with the carrying-wheels, a fixed plate, and a beveled edge on said plate for releasing said auxiliary bar.

19. In a calculating attachment to type-writers, the combination with the type-writer carriage, of a slide connected to said carriage and moving in unison therewith, a stationary slideway open at its end to permit the removal of said slide therefrom, a registering mechanism laterally adjustable on said slide, and means for operating said registering mechanism.

20. In a calculating attachment to type-writers, the combination of a stationary slideway, a slide traveling therein in unison with the type-writer carriage, a receiving mechanism laterally movable on said slide, a series of apertures in said slide, a finger mounted on said receiving mechanism for entering any one of said apertures for locking said receiving mechanism in the desired position on said slide, and means for operating said receiving mechanism.

21. In a calculating-machine, the combination of figure-keys, laterally-shiftable pinions rotating as a single piece, connections between said keys and said pinions for transmitting the key motions to said pinions, and means for laterally shifting said pinions to connect and disconnect the same from the remaining parts of the mechanism.

22. In a receiving mechanism, a series of carrying-wheels, a series of swinging carrying-pinions connecting said wheels in pairs, said pinions swinging independently of each other, a swinging detent for locking the lowest one of said carrying-wheels, and a bar for simultaneously throwing said detent and all of said pinions into mesh with their respective carrying-wheels to thereby lock the mechanism.

HYMAN ELI GOLDBERG.

Witnesses:
ARTHUR M. COX,
SADIE WOLF.